(12) United States Patent
Horn et al.

(10) Patent No.: US 10,746,661 B2
(45) Date of Patent: Aug. 18, 2020

(54) PROFILE REACTOR FOR OPERANDO MEASUREMENTS

(71) Applicant: REACNOSTICS GmbH, Hamburg (DE)

(72) Inventors: Raimund Horn, Hamburg (DE); Oliver Korup, Hamburg (DE)

(73) Assignee: REACNOSTICS GMBH, Hamburg (DE)

( * ) Notice: Subject to any disclaimer, the term of this patent is extended or adjusted under 35 U.S.C. 154(b) by 0 days.

(21) Appl. No.: 16/324,763

(22) PCT Filed: Aug. 14, 2017

(86) PCT No.: PCT/EP2017/070633
§ 371 (c)(1),
(2) Date: Feb. 11, 2019

(87) PCT Pub. No.: WO2018/033523
PCT Pub. Date: Feb. 22, 2018

(65) Prior Publication Data
US 2019/0187059 A1   Jun. 20, 2019

(30) Foreign Application Priority Data

Aug. 16, 2016   (DE) .................. 10 2016 009 923

(51) Int. Cl.
*G01J 3/00*   (2006.01)
*G01N 21/75*   (2006.01)
(Continued)

(52) U.S. Cl.
CPC ......... *G01N 21/75* (2013.01); *G01N 21/0332* (2013.01); *G01N 21/05* (2013.01);
(Continued)

(58) Field of Classification Search
CPC .... G01N 21/75; G01N 21/0332; G01N 21/05; G01N 21/65; G01N 2021/052; G01N 2021/0389; G01N 2021/0346; G01J 3/44
See application file for complete search history.

(56) References Cited

U.S. PATENT DOCUMENTS

2006/0245976 A1* 11/2006 Kawahito .............. G01N 21/27
                                                                422/72
2009/0184242 A1*  7/2009 Howald ................. G01Q 20/02
                                                                250/306

FOREIGN PATENT DOCUMENTS

CN       103411940 B       6/2014
WO       1997043611 A1    11/1997
WO       2011072701 A1     6/2011

OTHER PUBLICATIONS

PCT/EP2017/070633 International Search Report and Written Opinion, dated Nov. 6, 2017, 13 pages.

* cited by examiner

*Primary Examiner* — Abdullahi Nur
(74) *Attorney, Agent, or Firm* — Beusse, Wolter, Sanks & Maire PLLC; Robert L. Wolter (57) ABSTRACT

The invention pertains to a system for operando measurements that comprises,
  a reactor (1) comprising a reactor chamber (9) having at least one window (19) transparent for radiation for irradiating a sample (24) provided inside the reaction chamber (9),
  a radiation source (21, 31) for generating the radiation for irradiating the sample (24), wherein the radiation source (21, 31) is arranged to irradiate the sample at an irradiation location situated on the sample;
  a detection unit (26, 33) for detecting radiation scattered, emitted, reflected or diffracted by the sample (24) or transmitted through said sample (24),
(Continued)

a sampling capillary (12) comprising an orifice (14) for collecting a fluid sample inside the reactor chamber (9), wherein the orifice (14) of the sampling capillary (12) is arranged at a fixed position relative to the irradiation location, wherein the reactor (1) is movable relative to the radiation source (21, 31).

10 Claims, 3 Drawing Sheets

(51) Int. Cl.
  *G01N 21/65* (2006.01)
  *G01N 21/03* (2006.01)
  *G01N 21/05* (2006.01)
(52) U.S. Cl.
  CPC ..... *G01N 21/65* (2013.01); *G01N 2021/0346* (2013.01); *G01N 2021/0389* (2013.01); *G01N 2021/052* (2013.01)

PROFILE REACTOR FOR OPERANDO MEASUREMENTS

The invention relates to a system for operando reactor profile measurements. Further, the invention relates to a method for analyzing a sample using said system. Main field of application of this invention are heterogeneous catalytic reactions with the aim to establish structure activity relations from measurements with said system.

Reactor measurements are central to heterogeneous catalysis research. Apart from reactors which feature a number of discrete sampling points, typically less than ten, all reactor designs have in common that reaction products are analyzed in the reactor effluent stream be it gaseous or liquid. The reaction pathway, i.e. how the reactants are transformed into products remains hidden. Heterogeneous catalysts are often characterized spectroscopically to investigate their geometric and electronic structure, surface species and active sites under reaction conditions. As a catalyst is a dynamic system and adapts to its chemical environment, operando spectroscopy becomes more and more important in heterogeneous catalysis research. Operando spectroscopy techniques aim at bridging the material and pressure gap by studying polycrystalline powders or supported catalysts under working reaction conditions. State of the art operando cells allow spectroscopy of the catalyst for a user specified set of operation conditions (temperature, pressure, concentrations etc.). Spatial profiles cannot be resolved. Therefore a need exists for a profile reactor for operando measurements that allows spatially resolved measurement of spectroscopic data and correlation of this data with local temperature and concentration values inside the catalyst bed.

M. Bosco, F. Vogel, Catalysis Today, 116 (2006) 348-353, describe an optically accessible channel reactor for the kinetic investigation of hydrocarbon reforming reactions. The reactor allows surface temperature measurements along the reactor through a quartz window using IR thermography. The catalyst is coated as a thin layer onto a metal plate placed at the bottom of the reactor channel. The massive metal body of the channel reactor may be heated by heating cartridges such that a uniform temperature distribution along the channel can be maintained. A small stream of gas can be withdrawn with a moveable capillary to measure the concentration profile in the reactor. The catalyst surface temperature is measured using an infrared camera. By using a quartz glass window the spectral range of the camera has to be in the near infrared region. To take into account the emissivity of the catalyst surface a calibration is performed. A thermocouple is placed in close contact to the catalyst surface and the reactor is heated to different temperatures until the reactor is well thermally equilibrated. A power law is fitted to the data points. After an infrared picture of the catalyst surface is taken, the measured intensities are read out along the center line of the reactor in flow direction. The temperature difference is calculated between the measured temperature of the catalyst surface during the reaction and during flushing the reactor with pure argon at constant setting of the heating system. The reactor described by Bosco and Vogel is restricted to catalysts coated at the channel walls and does not allow for simultaneous spectroscopic profile measurements.

R. Horn, K. A. Williams, N. J. Degenstein, L. D. Schmidt, Journal of Catalysis 242 (2006) 92-102 investigated the mechanism of catalytic partial oxidation of $CH_4$ on Rh-coated $\alpha$-$Al_2O_3$ foam monoliths by measuring species and temperature profiles along the catalyst axis and comparing them with numerical simulations. A thin quartz capillary connected to a quadrupole mass spectrometer is moved through the catalyst with a spatial resolution of about 0.3 mm. The reaction is carried out in a quartz tube. High-purity reactants $CH_4$, $O_2$ and the internal standard Ar are fed through calibrated mass flow controllers through a side port at the bottom of the tube and leave the reactor from the top for incineration. An injection needle inserted through a septum at an end port at the bottom of the tube enables guided movement of the capillary without noticeable gas losses. $\alpha$-$Al_2O_3$ foams loaded with Rh are used as catalysts. To avoid axial radiative heat losses in the reaction tube, two uncoated $\alpha$-$Al_2O_3$ foams are used as heat shields. To avoid bypassing of gas, the catalyst and the heat shields are tightly wrapped in alumo-silicate paper. The reaction profiles are measured by sliding a 20 cm long fine quartz capillary through a channel, diamond drilled through the centerline of the catalyst. The lower end of the capillary is connected to a ported micro volume tee. The opposite port is used to feed a thermocouple into the capillary. The tip of the thermocouple is aligned flush with the open end of the capillary to measure species composition and temperature simultaneously at each point in the catalyst. The side port of the tee is connected to a stainless steel capillary, which is inserted into the inlet valve of a mass spectrometer vacuum chamber. At the end of the stainless steel capillary, a rotary vane pump generates a vacuum of about 500 mTorr, forcing a permanent flow from the end of the quartz capillary positioned in the catalyst to the sapphire seat of the MS inlet valve. The tee is mounted on a micrometer screw so that the capillary can be moved up and down with sub-millimeter resolution. All profiles are measured by sliding the capillary tip down (i.e., against the flow direction) from a position 3 mm downstream to the end of the catalyst through the catalyst up to about 5 mm into the front heat shield. Using this technique, the open channel is left downstream of the capillary tip and does not influence the sample composition at the tip position. The reactor described in this paper does not allow for simultaneous spectroscopic profile measurements.

In a further paper, Journal of Catalysis, 249 (2007) 380-393, R. Horn, K. A. Williams, N. J. Degenstein, A. Bitsch-Larsen, D. Dalle Nogare, S. A. Tupy and L. D. Schmidt describe a modified reactor and capillary sampling system. The sampling capillary comprises a side sampling orifice and a thermocouple aligned with the sampling orifice. The quartz sampling capillary and thermocouple meet in a stainless steel tee, the third port of which is connected to a stainless steel capillary that discharges into the inlet valve of a mass spectrometer. A pump generates a vacuum at the end of the stainless steel capillary, forcing the gases from the sampling orifice into the mass spectrometer. Moving the capillary/thermocouple assembly up and down allows measuring species and temperature profiles along the centerline of the catalyst. The measured temperature is a gas temperature as the thermocouple is in thermal contact with the flowing gas but not with the catalyst surface. The reaction cell is self-supported on a steel mounting frame with stainless steel inlet and outlet tubes. The sampling capillary is guided in steel capillary liners to avoid any bending leading to uncertainties in the sampling orifice position. The compact and rigid self-supported construction of the reactor provides precise geometric alignment and is easy to dismantle and reassemble. The capillary is moved by a stepper motor mounted underneath the reactor. This allows automatization of the experiment such that larger experimental campaigns may be conducted. Also this modified reactor does not allow for simultaneous spectroscopic profile measurements.

J. Urschey, P. A. W. Weiss, J. Scheidtmann, R. Richter, W. F. Mair, Solid State Science 5 (2003) 909-916 describe a reactor for high throughput catalyst screening. In this setup a sampling needle is fixed in space containing inside a heating wire, a thermocouple, a MS transfer capillary, a GC transfer capillary and a feed gas capillary. A heated well plate containing up to 207 different catalyst samples is positioned in x,y,z direction under the sampling needle such that it probes each well sequentially to monitor catalyst activity.

The system does neither allow for spatial profile measurements of species and temperature, nor does it allow for conducting spectroscopic profile measurements. The system also does not provide defined flow or mixing pattern and no kinetic information can be obtained. In each well catalyst particles at the top layer directly underneath the feed gas capillary see fresh feed while other particles not in vicinity to the feed gas capillary as well as in deeper layers are in a dead space.

To understand heterogeneous catalysis in more detail it is desirable to follow during reaction how the reactants are transformed into products and how the catalyst changes along the reactor coordinate.

In WO 2011/072701 A is described a reactor concept for in-situ measurements of spatially resolved kinetic and spectroscopic data. Inside a reactor chamber is movably arranged a capillary that can be used to take samples inside the reactor chamber. The capillary has an orifice provided in its side wall for sample taking. The samples are then transported e.g. to a gas chromatograph for analysis. Inside the capillary is situated a glass fiber with its beveled tip being arranged at the orifice of the sampling capillary. The glass fiber can be used to direct light onto a sample situated in the reaction chamber and to collect light reflected from the sample. The reflected light can be used to analyze the sample by e.g. Raman-spectroscopy.

The reactor described in WO 2011/072701 and in Catal. Sci. Technol. 3 (2013) 169-175 allows performing simultaneous species, temperature and spectroscopic profile measurements inside a catalyst bed under reaction conditions. However, the system has several distinct disadvantages. Firstly, light used for spectroscopy has to pass through a light guiding fiber or light guiding capillary on the way into the reactor and back, respectively. Here the light interacts with the material of the light guides and creates a detrimental background spectrum. As described in WO 2011/072701 this background can be so strong to cover the signal from the sample.

Secondly the light leaves the excitation fiber in a diverging cone and cannot be focussed on the catalyst sample. This leads to low excitation intensities at the sample. Thirdly the spatial overlap between the excitation light and the light emitted or scattered from the sample is small, viz. the solid angle of collection is small. This leads to low spectroscopic signals. Fourthly, the reactor requires large amounts of catalyst ranging from several grams to several hundred grams of catalyst.

The problem underlying the invention therefore is to solve the above described problems and to provide a system for operando measurements that allows monitoring of a sample, e.g. a catalyst, in a reactor under working conditions wherein only small amounts of a test sample are required to obtain precise information of the reactor state.

The problem is solved by a system for simultaneous operando spatial profile measurements of species and spectroscopic information as defined in claim 1. Preferred embodiments are defined in depending claims.

The system for simultaneous operando spatial profile measurements of species and spectroscopic information according to the invention comprises:
- a reactor comprising a reactor chamber having at least one window transparent for radiation for irradiating a sample provided inside the reaction chamber,
- a radiation source for generating the radiation for irradiating the sample, wherein the radiation source is arranged to irradiate the sample at an irradiation location situated on the sample;
- a detection unit for detecting radiation scattered, emitted, reflected or diffracted by the sample or transmitted through said sample,
- a sampling capillary comprising an orifice for collecting a fluid sample inside the reactor chamber, wherein the orifice of the sampling capillary is arranged at a fixed position relative to the irradiation location, wherein the reactor is movable relative to the radiation source.

In the system according to the invention a reactor is provided that is movable, i.e. can be shifted from a first position to a second position. According to an embodiment, the reactor is movable continuously such that optical spectra or X-ray diffraction pattern can continuously be recorded during reactor movement.

According to a further embodiment, the reactor is movable in a stepwise manner. In this embodiment, the reactor is positioned in a first position and a first spectrum can be determined using the radiation source for irradiating the sample. Then the reactor is shifted to a second position different from the first position and a second spectrum is determined using the radiation source for irradiating the sample.

The reactor comprises a reactor chamber that can be filled with a sample, e.g. a catalyst sample. According to an embodiment, the reactor chamber can be cooled or heated to adjust a reaction temperature inside the reactor chamber. For this purpose devices for heating or cooling may be provided at or inside the reactor chamber. For heating may be provided e.g. an electrical heating, e.g. a heating coil placed close to the reactor chamber or being placed inside the reactor chamber. The electric heating is connected to a corresponding electric power source. According to a further embodiment the reactor chamber is surrounded at least partially by a heating or cooling jacket through which a heating or cooling medium is flown. As a heating medium can be used e.g. water, oil, or a salt mixture. For cooling can be provided e.g. one or several channels provided inside the reactor wall, or e.g. a cooling jacket, through which a cooling medium, e.g. water or a salt mixture, can be flown. Devices for adjusting or keeping a temperature at a particular level, e.g. a thermostat, may be provided according to an embodiment, to keep temperature in the reactor chamber at a desired level.

The temperature inside the reactor chamber may be constant or according to a further embodiment may have a temperature gradient in at least one spatial direction, e.g. in the longitudinal direction of a fluid stream passing through the reaction chamber. According to a further embodiment a temperature gradient may also exist in a direction orthogonal to the longitudinal direction.

According to an embodiment, the reactor is designed as a flow reactor through which is transported a fluid medium, i.e. a gaseous or liquid phase, e.g. reaction components or inert components, like a carrier gas. The reactor has according to an embodiment the form of a packed-bed reactor or is a column reactor.

At least one connection for introducing or discharging a fluid medium into or from the reaction chamber is provided according to an embodiment. The fluid medium may be gaseous or liquid. It is also possible that the fluid medium concurrently comprises a liquid and a gaseous phase. It is also possible that the fluid medium is in a supercritical state. Devices for introducing the fluid medium into the reaction chamber or for discharging it therefrom may be provided according to an embodiment. A suitable device for introducing the fluid medium into the reaction chamber or for discharging it therefrom is e.g. a pump for pumping a gaseous or liquid medium. However, according to an embodiment it is also possible to provide at least one pressurized container, e.g. a gas bomb as used e.g. in a laboratory, and a valve for adjusting pressure inside the reaction chamber. If the fluid medium comprises several components, e.g. several gases, mixing devices can be provided for mixing the gas components to obtain a homogeneous gaseous medium to be introduced into the reaction chamber.

Control devices for adjusting and controlling the flow of the fluid medium are provided according to an embodiment. An exemplary device is a computer connected to a valve or a pump to control the flow of the fluid medium by adjusting the opening of the valve or the delivery rate of the pump.

The reactor and the wall of the reactor chamber are made of a suitable material. A suitable material is a material that is stable or inert under reaction conditions occurring in the reactor chamber. A suitable material is e.g. a metal, e.g. steel. However, also other materials can be used, e.g. ceramics or glass. A suitable material for the reactor is e.g. stainless steel.

The reactor and the reactor chamber can basically have every desired size. Preferably the reactor takes the form of a micro-reactor. A suitable size according to an embodiment is a size wherein the reactor chamber can be filled completely with about 1 to 20 g of a sample, e.g. a powder sample or a granulated sample. According to an embodiment, the reactor chamber has a length in a longitudinal direction of at least 10 mm, according to a further embodiment of at least 20 mm, according to a further embodiment of at least 30 mm, according to a further embodiment of at least 40 mm, and according to a further embodiment of at least 50 mm. According to a further embodiment, the reactor chamber has a length in a longitudinal direction of less than 200 mm, according to a further embodiment of less than 150 mm, according to a further embodiment of less than 100 mm, and according to a further embodiment of less than 75 mm.

The longitudinal direction is understood to be that direction in which the reactor chamber has its largest elongation and which according to an embodiment is a direction in which the reactor is shifted in a linear direction.

According to a further embodiment, the reactor chamber has a dimension in a transversal direction, i.e. in a direction perpendicular or orthogonal to the longitudinal direction, of less than 50 mm, according to a further embodiment of less than 20 mm, according to a further embodiment of less than 10 mm, according to a further embodiment of less than 8 mm, and according to a further embodiment of less than 6 mm. According to an embodiment, the reactor chamber has a dimension in a direction perpendicular to the longitudinal direction of more than 1 mm, according to a further embodiment of more than 2 mm, according to a further embodiment of more than 3 mm and according to a further embodiment of 4 mm.

The cross section of the reactor chamber can have the form of a circle but according to another embodiment can also have e.g. a square, rectangular, oval or ellipsoidal form. Other cross sections are possible. According to a preferred embodiment the reactor chamber has a circular cross section.

The reactor chamber is equipped with at least one window transmissive for a radiation for irradiating a sample situated inside the reactor chamber. According to an embodiment, a window is understood to be transmissive or transparent for a radiation when the radiation after passing the window has at least 20%, according to an embodiment at least 50% and according to a further embodiment has at least 80% of the intensity of the inclining radiation. A window having low transmissivity for radiation is e.g. used for X-ray diffraction. Such window may have a transmissivity as low as 20%, i.e. the radiation has only 20% of the intensity of the inclining radiation after passing the window. To obtain a sufficient signal quality a longer measurement time can be chosen. For radiation in the visible range materials with higher transmissivity are available. Here a transmissivity of at least 80% can be achieved. According to an embodiment, the intensity of the radiation after passing the window is less than 100%, according to a further embodiment less than 98%, according to a further embodiment less than 95%, and according to a further embodiment less than 90% of the intensity of the inclining radiation.

The window can be arranged on one side of the reactor chamber and can form part of a side wall of the reactor chamber or can form an entire wall of the reactor chamber on at least one side of the reactor chamber. According to an embodiment two windows are arranged on opposite sides of the reactor chamber such that a radiation beam can enter the reactor chamber on one side and can leave the reactor chamber on the opposite side after having interacted with a sample arranged in the reactor chamber.

Irradiation of a sample by a radiation is understood to be any interaction between the sample and the radiation. The radiation can be absorbed by the sample and an absorption spectrum can then be detected. According to a further embodiment, the sample is irradiated by a radiation and then emits radiation of a wavelength different to the wavelength of the radiation used for irradiating the sample. An emission spectrum can then be detected. According to a further embodiment Raman-spectroscopy is used for analysis of the sample, i.e. radiation scattered by the sample is collected for analysis. It is also possible that the radiation is reflected or diffracted by the sample, e.g. when using X-ray-diffraction as a method for analyzing the sample. The radiation used for analysis of the sample inside the reactor chamber is according to an embodiment electromagnetic radiation.

The at least one window is plane according to a first embodiment. A plane window is preferred when using e.g. visible light, infrared or ultraviolet radiation for irradiating the sample arranged inside the reactor chamber.

According to another embodiment, the at least one window is curved in at least one direction. A curved window is preferably used e.g. when X-ray radiation is used for irradiating the sample situated inside the reactor chamber. According to an embodiment, the curved window takes in its cross section the form of a circle segment.

The at least one window has according to an embodiment a dimension in a longitudinal direction of the reactor that corresponds to the longitudinal dimension of the reactor chamber. According to an embodiment, the at least one window has a dimension in a longitudinal direction of at least 50%, according to further embodiment of at least 75% and according to a still further embodiment of at least 90% of the longitudinal dimension of the reactor chamber.

The at least one window has according to an embodiment a dimension in a transversal direction of the reactor that corresponds to the transversal dimension of the reactor chamber. According to an embodiment, the at least one window has a dimension in a transversal direction of at least 1%, according to a further embodiment at least 5%, according to a further embodiment at least 10%, according to further embodiment of at least 50% and according to a still further embodiment of at least 90% of the transversal dimension of the reactor chamber. According to an embodiment the at least one window has a dimension in a transversal direction of the reactor of less than 50%, according to a further embodiment of less than 25%, according to a further embodiment of less than 10%, and according to a further embodiment less than 5% of the transversal dimension of the reactor chamber. A transversal direction is understood to be orthogonal to the longitudinal direction of the reactor chamber.

In particular when analyzing the reactor only in a longitudinal reaction the width, i.e. the dimension of the window in a transversal direction is selected small to reduce thermal losses due to the window. According to an embodiment, the width of the window in a transversal direction of the reactor is selected within a range of 1 to 10% of of the transversal dimension of the reactor chamber.

In an embodiment, in which the reactor chamber comprises more than one window, the dimensions of the window may be the same or can be different for the individual windows.

The at least one window is made of a material transparent or transmissive for a radiation for irradiating a sample situated inside the reactor chamber. The radiation can then pass the window and can interact with the sample to then leave the reactor chamber again to be e.g. analyzed by suitable analyzing equipment. The terms "transparent" and "transmissive" are used in an analogous manner.

The transparency of the window material is depending on the wavelength of the radiation used to irradiate the sample.

When visible or ultraviolet radiation is used for irradiating the sample, fused silica or quartz can be used as an exemplary material for the window.

If infrared radiation is used to irradiate the sample in the reactor chamber, zinc selenide or silicium can be used as a material for the window. When using X-rays for analyzing the sample, beryllium or a silicium crystal can be used as a material for the window.

The reactor is movable relative to a radiation source used for irradiating the sample inside the reactor chamber. According to an embodiment, the radiation source is in a fixed position and the reactor is movable relative to the radiation source. In particular the radiation source is in a fixed position when seen in a longitudinal direction of the movement of the reactor.

According to a further embodiment, the reactor is in a fixed position and the radiation source can be moved relative to the reactor. According to a still further embodiment, both, the reactor and the radiation source can be moved relative to each other. The movements of the reactor and the radiation source in the above mentioned embodiments occur in a longitudinal direction.

According to a first embodiment, the radiation source for generating the radiation for irradiating the sample inside the reactor chamber has a fixed position. According to an embodiment, the radiation source is in a fixed position when seen in the longitudinal direction of the reactor but can be movable in a direction divergent, in particular orthogonal to the longitudinal direction. Such embodiment is suitable e.g. when using X-ray diffraction for analysis of a sample placed in the reactor chamber. According to a further embodiment, the radiation source is in a fixed position and is not movable in a longitudinal direction and a direction divergent from the longitudinal direction.

The movable reactor with the reactor chamber provided therein is then passed by the radiation source such that the radiation or radiation beam emitted by the radiation source passes the window to enter the reactor chamber to irradiate a sample positioned inside the reactor chamber. The sample is irradiated at a first position of the reactor. The reactor is then moved to a second position distant from the first position such that the radiation beam now passes the window and enters the reactor chamber to irradiate the sample at a second location.

According to a first embodiment, the reactor is movably in linear direction parallel to the longest axis of the reactor chamber and the direction of the fluid flow in the reactor chamber. The system can then be used to obtain a profile of the sample in a longitudinal or length direction of the reactor.

According to a further embodiment, the reactor can be moved in a direction divergent from the longitudinal direction of the reactor. Such direction can be e.g. a direction orthogonal to the longitudinal direction of the reactor. According to this embodiment, a profile of the sample comprised in the reactor can be obtained in a direction orthogonal (perpendicular) to the longitudinal direction of the reactor wherein the longitudinal direction corresponds to the flow direction of a fluid phase passing the reactor chamber.

Since the radiation source for irradiating a sample inside the reactor chamber of a reactor is situated outside the reactor chamber more advanced designs can be used for e.g. focusing the radiation on a particular location of the sample and less losses of intensity of radiation scattered, emitted, reflected or diffracted by the sample or passing the sample occur. E.g. a suitable optic, e.g. a microscope, can be used to focus the radiation emitted by the radiation source at a particular site of the sample. The intensity of the radiation required for examination of a sample inside the reactor chamber therefore can be low due to small losses of radiation intensity through scattering.

According to a preferred embodiment, the reactor is movable and the radiation source is placed in a fixed position. The radiation emitted by the radiation source can be focused at a particular area within the reactor chamber, an irradiation location, and by moving the reactor the sample can be examined at different areas to obtain a profile.

The detector is according to an embodiment placed at a particular and well defined position, e.g. to receive radiation scattered, emitted, reflected or diffracted by the sample or having passed the sample. The radiation source and the detector can be placed on the same side of the reactor chamber. In such an embodiment it is usually only necessary to provide a single window of the reactor chamber for introducing radiation for irradiation of a sample in the reactor chamber and for receiving radiation scattered, emitted, reflected or diffracted by the sample.

According to a further embodiment, the radiation source for irradiating a sample in the reactor chamber and the detector for receiving radiation after interaction of the irradiating radiation with the sample are placed on different sides of the rector chamber. According to an embodiment the radiation source for irradiating a sample in the reactor chamber and the detector for receiving radiation are placed on opposite sides of the reactor chamber. Such arrangement is e.g. suitable for detecting radiation that has passed a sample wherein part of the radiation has been absorbed by the sample. According to a further embodiment radiation source and detector are arranged including a particular angle to each other. The angle is selected such to obtain a high intensity of the detected radiation after interaction with the sample. Such embodiment is e.g. suitable when using X-ray diffraction for analysis of the sample.

For moving the reactor, the reactor is mounted according to an embodiment on e.g. a table which is slidably mounted e.g. on rails. An actuator can be provided for moving the reactor in a defined movement.

According to a further embodiment, the radiation source and the detector are arranged movably. Such arrangement is used e.g. in an embodiment wherein X-ray diffraction is used for analyzing a sample situated inside the reactor chamber of the reactor. According to an embodiment arrangements are made that the directions of movement of the reactor and of the radiation source are orthogonal to each other.

According to an embodiment radiation source and detector are movably on a circular path wherein the center of the circle is arranged in the reactor chamber. According to an embodiment, the axis of the circle matches with the surface of the sample inside the reactor chamber. Such arrangement is in particular suitable for using X-ray diffraction for analysis of a sample placed in the reactor chamber of the movable reactor.

The radiation source is selected according to the analysis method used for analysis of a sample provided in the reactor chamber of the movable reactor.

The radiation can have a narrow wavelength spectrum or comprise radiation of a particular wavelength as e.g. available from a laser. A laser as a radiation source is e.g. preferable when using Raman-spectroscopy for analysis of a sample provided in the reactor chamber of the movable reactor.

According to another embodiment, a radiation source emitting a broad emission spectrum is provided for the system for operando spectroscopic measurements according to the invention. Such a radiation source is e.g. suitable when using infrared spectroscopy or spectroscopy in the ultraviolet, visible or near infrared region of the electromagnetic spectrum for analysis of the sample provided in the reaction chamber.

According to a further embodiment, an X-ray source is used as a radiation source for generating the radiation for irradiating a sample placed inside the reactor chamber of the reactor.

According to an embodiment the radiation source emits radiation selected within a range of $10^{-11}$ to $10^{-3}$ m. Preferred ranges for the wavelength of radiation emitted by the radiation source are 2.5 µm to 25 µm when using infrared spectroscopy for analysis, 760 to 2500 nm, when using NIR-spectroscopy (NIR=near infrared) for analysis; and 200 nm to 800 nm when using UV/Vis-spectroscopy. When using X-ray diffractometry for analysis of a sample the radiation emitted by the radiation source preferably has a wavelength in a range of 1 pm to 10 nm.

In the system according to the invention, a sampling capillary is arranged in the reactor chamber for taking samples of a fluid phase present in the reactor chamber. The sampling capillary comprises an orifice for collecting a fluid sample inside the reactor chamber, wherein the orifice of the sampling capillary is arranged at a fixed position relative to the irradiation location. By this arrangement it is possible to correlate data obtained by analysis of the fluid sample with data obtained by spectroscopic methods available by irradiating the sample provided inside the reactor chamber with radiation generated by the radiation source and detected by the detection unit.

The fluid samples taken in the reactor chamber are then transported to a place outside the reactor chamber to be further analyzed, e.g. by gas chromatography. Other methods for analysis of the fluid sample collected from the reactor chamber may also be used, e.g. HPLC or mass spectrometry.

According to an embodiment, the sampling capillary is arranged such that the sampling capillary is traversing the reactor chamber. Both distal ends of the capillary are preferably situated outside the reactor chamber.

According to an embodiment, the capillary is open at at least one distal end and according to a further embodiment the capillary is open at both distal ends.

According to an embodiment, the at least one open distal end is connected to a device for analyzing a fluid sample extracted from the reactor chamber. For taking a sample inside the reactor chamber, an orifice is provided in the sampling capillary, preferably in a side wall of the capillary, such that a fluid sample from the reactor chamber can be introduced into the sampling capillary to be transported to the device for analyzing the fluid sample.

According to an embodiment, the orifice is placed at a location on the sidewall of the sampling capillary such that the orifice is still placed inside the reactor chamber when the reactor is shifted to its maximum deflection.

The at least one open end can be used according to another embodiment to introduce an analysis device into the reactor chamber. Such analysis device can be according to a further embodiment a thermocouple for determination of a temperature inside the reactor chamber or a pyrometer fiber to collect and guide thermal radiation to a detector outside of the reactor for temperature measurement.

The sampling capillary according to an embodiment has an inner diameter of less than 3 mm, according to a further embodiment of less than 2 mm and according to a still further embodiment of less than 1 mm. According to an embodiment, the inner diameter of the sampling capillary is at least 0.25 mm, according to an embodiment is at least 0.5 mm and according to a still further embodiment is at least 1 mm.

The orifice provided in a side wall of the sampling capillary according to an embodiment has a diameter of less than 200 µm and according to a further embodiment is within a range of 10 to 150 µm.

The wall thickness of the sampling capillary is preferably selected within a range of 5 µm to 100 µm and according to a further embodiment is selected within a range of 10 µm to 50 µm.

According to an embodiment the sampling capillary has a circular cross section.

The sampling capillary preferably is made of a material that is inert under the reaction conditions present in the reactor chamber. A suitable material for the sampling capillary is e.g. fused silica. Other suitable materials are e.g. metals, like aluminum, steel, in particular stainless steel, or ceramics.

According to an embodiment, the sampling capillary is stationary and the reactor comprising the reactor chamber is movable relative to the stationary sampling capillary.

According to an embodiment the orifice in the sidewall of the sampling capillary is arranged at a position in a longitudinal direction of the reactor chamber that corresponds to the position where the radiation emitted by the radiation source interacts with the sample placed inside the reactor chamber. The position within the sample provided in the reactor chamber, where the radiation emitted by the radiation source interacts with the sample corresponds to the irradiation location. The data obtained by spectroscopic methods can then be correlated to data obtained on the composition of the fluid phase sampled through the orifice of the sampling capillary.

The sample placed inside the reactor chamber preferably is solid and provided in granular or in powder form such that a fluid phase can pass through the reactor chamber.

According to a further embodiment, the system comprises at least one temperature-sensitive detector for determination of a temperature inside the reactor chamber. Depending on the type of temperature-sensitive detector provided, it is possible to obtain information on the temperature of the sample, e.g. a catalyst, i.e. on the stationary phase, or on the temperature of the fluid phase, i.e. the gaseous or liquid phase that forms a mobile phase. When using a thermocouple inside the sampling capillary as temperature sensitive detector, the fluid sampled through the sampling orifice is in direct contact with the thermocouple tip which allows determination of the temperature of the fluid phase. When using a pyrometer fiber to collect and guide thermal radiation to a detector outside of the reactor for temperature measurement the thermal radiation emitted from the sample inside the reactor chamber, e.g. from the surface of a catalyst, can be collected and the temperature of the solid phase can be calculated therefrom.

According to an embodiment the thermocouple or the pyrometer fiber is introduced into the sampling capillary. The thermocouple or the pyrometer fiber is then protected against impact exerted e.g. by a sample provided inside the reactor chamber.

According to a further embodiment, the thermocouple or the pyrometer fiber is combined with the sampling capillary having an orifice in its side wall and being stationary arranged in the reactor chamber. The thermocouple or the pyrometer fiber is introduced from one open distal end of the sampling capillary whereas the opposite open distal end of the sampling capillary is used to transport a fluid sample collected inside the reactor chamber to the outside of the reactor for analysis e.g. in a mass spectrometer, a gas chromatograph or an HPLC-apparatus.

The tip of the thermocouple or the pyrometer fiber is preferably placed at the place of the orifice such that a temperature of the sample or of the fluid phase can be determined at the same place where samples from the fluid phase are collected inside the reactor chamber.

In particular, in an embodiment, where radiation source and detector, thermocouple tip or tip of the pyrometer fiber and the orifice of the sampling capillary are arranged such that by all three detection means information is provided from the same place within the reactor chamber and the reactor is moved continuously or step wise, it is possible to obtain detailed information on processes occurring in the reactor in a spatially resolved manner.

According to a further embodiment, a radiation source and radiation detector as described in WO 2011/072701 A that takes the form of a fiber, is provided in the reactor chamber as a second radiation source and a second radiation detector. The second radiation source and the second detector unit allows to perform spectroscopy in the volume of a sample arranged in the reactor chamber. The second radiation source comprises at least one fiber made of a material transmissive or transparent for the radiation and that guides radiation from a radiation source that is e.g. arranged outside the reactor chamber to a place inside the reactor chamber.

The radiation enters the transparent fiber on one end and exits the fiber at the opposite end. The radiation is directed onto the surface of a sample provided inside the reactor chamber to interact with the sample. After interaction radiation reflected, scattered or emitted by the sample is collected and guided to a processing unit where the collected radiation is processed to obtain e.g. a spectrum. For guiding the collected radiation reflected, scattered or emitted by the sample to the processing unit, a transparent or transmissive fiber can be used.

The processing unit is usually arranged outside of the reactor chamber. The processing unit corresponds to usual processing units as known in the field of spectroscopic methods and can comprise e.g. a unit for transforming intensity of an incoming radiation into a processible signal, e.g. an electric current of a particular intensity, a unit for processing the signal and transforming the signal e.g. into a spectrum, and a display unit for displaying the processed signal e.g. in the form of a spectrum. The unit for processing the signal and transforming the signal e.g. into a spectrum is, e.g. a computer with a corresponding program running thereon. The display unit for displaying the processed signal can be e.g. a plotter, a printer, or a display.

According to a further aspect, the invention is directed towards a method for analyzing a sample comprising the steps:

(1) Providing a system as described above;
(2) Arranging a sample inside the reactor chamber;
(3) Flowing a fluid through the reactor that reacts on or with the sample;
(4) Positioning reactor in a first position;
(5) Taking a fluid sample from the fluid flown through the reactor chamber at the first position by means of the sampling capillary and analyzing said fluid sample;
(6) Irradiating the sample arranged inside the reactor chamber at the first position by directing radiation emitted from the radiation source to an irradiation location on the sample;
(7) Detecting radiation scattered, emitted, reflected or diffracted by the sample arranged inside the reactor chamber or transmitted through the sample at the first position;
(8) Analyzing a sample state based on evaluation of the radiation scattered emitted, reflected or diffracted by the sample or transmitted through the sample;
(9) Moving the reactor into a position distant to the first position;
(10) Repeating steps (6) to (9) until a last position is reached.

In the method according to the invention a system as described is used which comprises a reactor that is movable, i.e. can be shifted from a first position to a second position and to further positions. In each position spectroscopic data can be obtained by irradiating a sample provided in the reactor.

In the beginning a sample is placed in the reactor chamber of the reactor comprised in the system according to the invention. According to an embodiment the sample is provided in powdery or granular form. The sample, according to a further embodiment, can also be provided in the form of a structured solid e.g. a monolith. The sample should be provided in a form that allows a fluid flow, in particular a gas flow, without build-up of a too high counter-pressure.

In an embodiment, in which the sample is provided in a particulate form, the size of the particles according to an embodiment is at least 100 µm, according to a further embodiment is at least 150 µm. According to a further embodiment, the size of the particles is less than 3 mm, according to a still further embodiment is less than 2 mm. The particles can have every shape and can e.g. take a ball-like rounded form, when using e.g. a granulate. However, the particles can also have a shaped form as known e.g. from catalyst technology.

Basically every solid sample can be analyzed in the system according to the invention. According to an embodiment, the sample is a catalyst. The catalyst can be every catalyst that catalyzes e.g. a chemical reaction or a biochemical reaction. In heterogeneous catalysis the reaction usually proceeds at the surface of the catalyst.

The size of the reactor and the reactor chamber is selected according to the requirements of the analysis performed on the sample. According to an embodiment, the reactor is designed as a microreactor, which allows rapid analysis of samples wherein only a small amount of sample is required. According to an embodiment, the size of the reactor chamber is selected such that it can be filled with an amount of sample selected within a range of about 1 to 20 g of a sample.

The dimensions of the reactor chamber have been described earlier. The reactor chamber has according to an embodiment a length of at least 10 mm, according to a further embodiment of at least 20 mm, according to a further embodiment of at least 30 mm, according to a further embodiment of at least 40 mm, and according to a further embodiment at least 50 mm. Since for the analysis of the sample is only required a small amount of sample, the size of the reactor chamber according to an embodiment is selected not too large. According to an embodiment, the reactor chamber has a size of less than 200 mm, according to a further embodiment of less than 150 mm, according to a further embodiment of less than 100 mm and according to a still further embodiment has a length of less than 75 mm.

Since the reactor is equipped with a window, radiation can be directed from the outside of the reactor chamber to the surface of the sample placed inside the reactor chamber to interact with the sample at an irradiation location.

The radiation is produced in a radiation source emitting radiation of a particular wavelength. As a radiation source can be used any radiation source as known from the field of spectroscopic analysis. A suitable radiation source is e.g. a laser emitting radiation of a particular wavelength. When X-rays are used for analysis of the sample by X-ray diffraction, synchrotron radiation, $CuK\alpha$-radiation or $MoK\alpha$ can be used according to an embodiment.

The radiation source is mounted stationary according to an embodiment and the reactor is moved to pass the radiation source. In an embodiment X-ray diffraction is used for analysis of the sample. Radiation source and radiation detector can then be moved on a circular path arranged orthogonal (perpendicular) to the moving path of the reactor chamber. However, also in such an embodiment, the volume or site, where analysis of the sample is performed, the irradiation location, is kept at a constant position and the reactor is moved such that spatially resolved analysis of the sample is possible.

Radiation scattered, emitted, reflected or diffracted by the sample or radiation transmitted through the sample is then collected by a detection unit. The detection unit basically comprises a receiver for receiving radiation scattered, emitted, reflected or diffracted by the sample or radiation transmitted through said sample, a converter for converting the received radiation into a processible signal, e.g. an electric impulse, a processing unit for converting the processible signal into an information that can be displayed, e.g. a spectrum, a signal intensity, etc.; and an output unit, for displaying the information in a form that can be interpreted, e.g. by a scientist. As already explained above, the processing unit is e.g. a computer with corresponding programs running thereon and the display unit is e.g. a display, a printer or a plotter.

In an embodiment of the invention it is possible to obtain spatially resolved information for the sample provided in the reactor chamber. According to an embodiment, the reactor is positioned in a first position and a first spectrum is obtained at a first irradiation location within the sample by irradiating the sample, detecting radiation scattered, emitted, reflected or diffracted by the sample or radiation transmitted through the sample and processing and interpreting the detected radiation.

Then the reactor is shifted in a second position and the process for obtaining information, e.g. a spectrum, from the sample in a second irradiation location distant from the first irradiation location is repeated. By repeating this process, e.g. by linearly and stepwise shifting the reactor, a spatial profile of spectroscopic information about the sample is obtained e.g. along a line connecting the locations on the sample, where measurements have been made using the radiation for irradiating the sample.

Usually the reactor is mounted on a device for shifting the reactor in a linear direction, e.g. a rail. For shifting the reactor a corresponding shifting device is provided, e.g. a electromotor with high precision, e.g. a step motor.

According to an embodiment, the radiation source is kept in place and the reactor is shifted along a linear path such that a spatial profile of spectral data is obtained, e.g. along the flow direction of a gas through a catalyst bed.

According to an embodiment, the reactor or the radiation source can be shifted in a direction deviating from a linear movement along a longitudinal direction of the reactor chamber, e.g. in a direction perpendicular to the linear movement direction of the reactor. With this embodiment a two-dimensional spatially resolved analysis of a sample can be obtained.

According to an embodiment, the reactor chamber can be heated or cooled to a particular temperature. According to an embodiment, the temperature determined inside the reactor chamber is at least 100° C., according to a further embodiment is at least 250° C. and according to a still further embodiment is at least 500° C. According to a further embodiment, the temperature as determined inside the reactor chamber is less than 1000° C. For keeping the temperature at a particular level a heating or cooling device is provided at the reactor chamber, e.g. a heating jacket or cooling jacket as described above.

For analyzing a sample e.g. a catalyst, under reaction conditions occurring e.g. in a chemical reactor, according to an embodiment a fluid is flown through the reactor chamber that reacts on or with the sample. The fluid phase comprises at least one reactant that reacts on or with the sample provided in the reactor, e.g. a catalyst. Besides the at least one reactant other components can be comprised in the fluid phase, e.g. an inert diluent, like an inert gas or a solvent. An inert gas is understood to be a gas that does not participate in the reaction of the reactants.

According to an embodiment, an access is provided in the reactor chamber for introducing a fluid phase and a further access is provided for withdrawing the fluid phase from the reactor chamber. Corresponding regulation means are provided according to an embodiment for adjusting the fluid flow in the reactor chamber, e.g. a valve.

According to a further embodiment, a device for extracting a sample of a fluid phase from the reactor chamber is provided in the system according to the invention. By taking samples of the fluid phase inside the reactor chamber, more detailed information on processes occurring inside the reactor chamber are available.

According to an embodiment, the fluid sample is taken from the reactor chamber by using a sampling capillary, said sampling capillary having at least one orifice for taking a sample inside the reactor chamber. Possible configurations of the capillary have been described above. The sample is then transported to an open end of the capillary to be transferred and analyzed by an analyzing device, e.g. a gas chromatograph or an HPLC-apparatus or a mass spectrometer.

According to a preferred embodiment the sample is taken inside the reactor chamber by a sampling capillary that is stationary and is traversing the reactor chamber. The sample is taken through an orifice provided in a side wall of the sample capillary and is then transported to one open end of the sampling capillary to be forwarded to an analysis tool, e.g. a gas chromatograph or a HPLC apparatus as described above.

A spatially resolved composition of the fluid phase is obtained by shifting the reactor along the stationary sampling capillary. According to this embodiment, the reactor is shifted into a first position and a first sample of the fluid phase is taken from the reactor chamber at a first location within the reactor chamber, preferably corresponding to the first irradiation location. The data obtained from analysis of the fluid phase sample and the data obtained from spectroscopic analysis can then be correlated. The reactor is then shifted relative to the stationary sampling capillary and a second sample of the fluid phase is taken at a second location within the reactor chamber, preferably corresponding to the second irradiation location of the spectroscopic analysis. The process is repeated after shifting the reactor to the next position to obtain a profile of the composition of the fluid phase along a path of the locations where a sample has been taken.

At the same time data on the sample provided in the reactor chamber, e.g. a catalyst, can be obtained by irradiating the sample by a radiation interacting with the sample and analyzing the radiation scattered, emitted, reflected or diffracted by the sample or analyzing the radiation passing through the sample. Since the reactor is moved relative to the radiation source while keeping the radiation source in a fixed position, the data obtained by analyzing the fluid phase sample taken from the fluid phase inside the reactor chamber can be correlated with the data obtained from the radiation scattered, emitted, reflected or diffracted by the sample provided in the reactor chamber or the radiation passing through the sample.

According to an embodiment, the sample provided in the reactor chamber is a solid phase sample.

According to a preferred embodiment, the data on the composition of the fluid phase are obtained at the same location as the data obtained from the radiation scattered, emitted, reflected or diffracted by the sample provided in the reactor chamber or the radiation passing through the sample provided in the reactor chamber. The same location is understood to be a location within an area or volume surrounding a location where data are obtained from the radiation scattered, emitted, reflected or diffracted by the sample provided in the reactor chamber or the radiation passing through the sample provided in the reactor chamber such that a correlation between the data on the composition of the fluid phase and the data obtained from the radiation scattered, emitted, reflected or diffracted by the sample provided in the reactor chamber or the radiation passing through the sample provided in the reactor chamber can be made.

The fluid phase can be a single phase fluid such as a gas or a liquid or a multiphase fluid such as two immiscible liquids or a liquid and a gas.

According to a further embodiment, the temperature is determined inside the reactor chamber. According to a further embodiment, the temperature of the fluid phase sample is determined inside the reactor chamber. According to a still further embodiment, the temperature is determined at an irradiation location of irradiation of the sample provided in the reactor chamber by the radiation for irradiating the sample and/or at the location of the orifice provided in the sampling capillary for collecting a sample of the fluid phase inside the reactor chamber. The temperature determined can then be correlated with the spectroscopic data obtained for the sample provided in the reaction chamber and/or the data obtained on composition of the fluid phase by taking a fluid phase sample in the reactor chamber through the sample capillary.

For determination of the temperature is used according to an embodiment a pyrometer fiber that is according to a further embodiment inserted in a sampling capillary provided in the reactor chamber. Preferably the tip of the pyrometer fiber is located at an orifice of the sampling capillary. In a further embodiment a thermocouple is used for determination of the temperature that is according to a further embodiment inserted in a sampling capillary provided in the reactor chamber.

Figure 1:
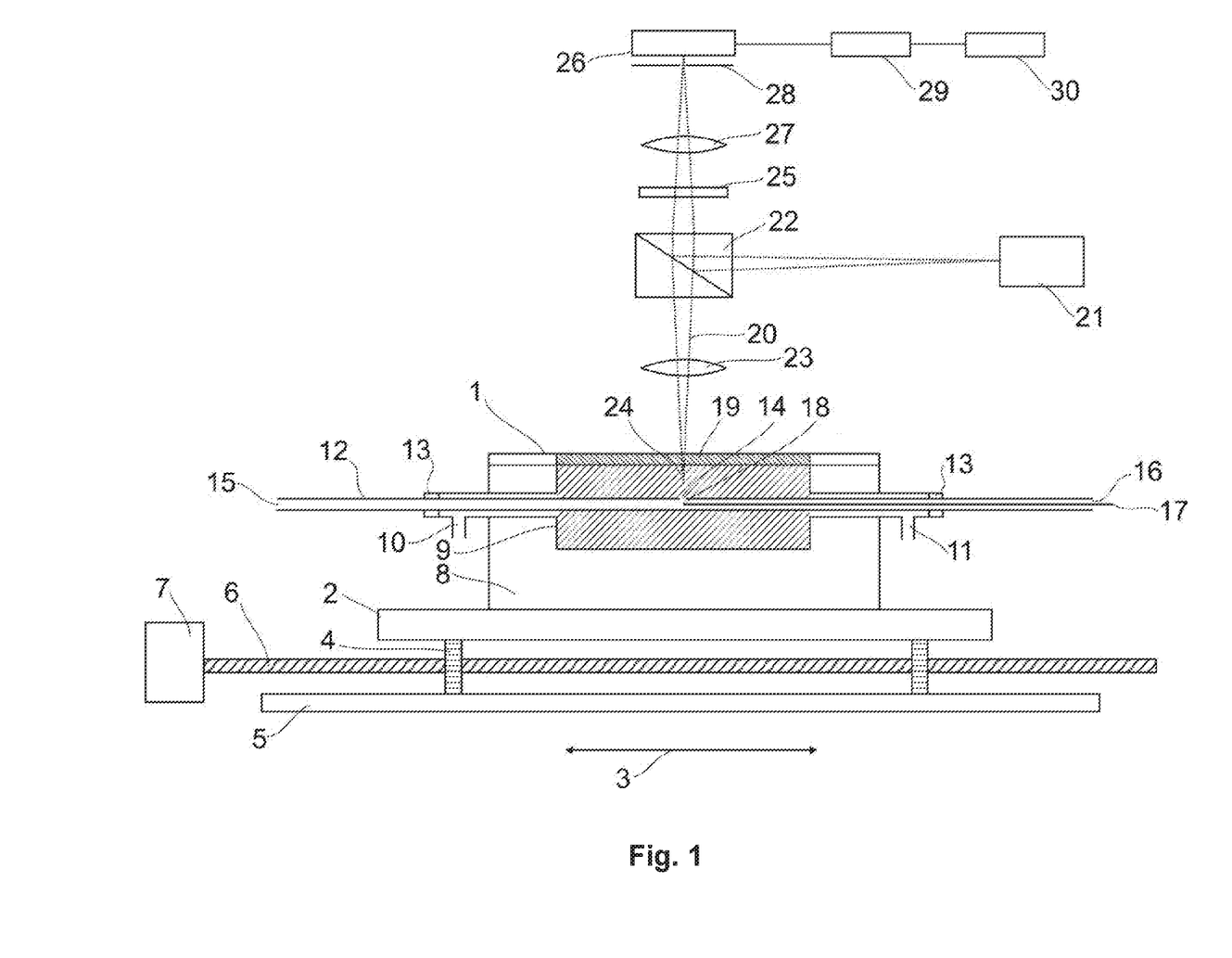
FIG. 1: a system according to a first embodiment comprising a reactor according to the invention wherein spectroscopic analysis is made by Raman-spectroscopy.

The system according to the invention will be described in further detail with reference to the accompanying figures, wherein shows:

FIG. 1 is a schematic presentation of a system according to the invention wherein Raman-spectroscopy is used as exemplary method for analysis of a sample provided in the reactor chamber and forming a stationary phase.

A heatable reactor 1 is mounted on a table 2 that can be shifted along a longitudinal direction 3. The table is mounted on supports 4 which are slidably mounted on rails 5. A spindle 6 is connected to a motor 7 for rotating the spindle. The spindle 6 is provided with a screw thread that interacts with a corresponding screw thread mounted to table 2. By rotating spindle 6, table 2 can be moved back and forward along a longitudinal direction 3. Table 2 is provided with a cooling device (not shown) to absorb heat emitted from reactor 1. The reactor 1 comprises a thermally insulated reactor case 8 surrounding a reactor chamber 9. The reactor case 8 acts as an insulation for reactor chamber 9 and can be equipped with a heating or cooling device (not shown) for controlling the temperature of the reactor chamber 9. An inlet 10 and an outlet 11 is provided to introduce a fluid phase, e.g. a gaseous phase, into reaction chamber 9 on one side and to let out the fluid phase on the opposite side to generate a plug flow through reactor chamber 9. A sampling capillary 12 is traversing reaction chamber 9. Seals 13 are provided close to the reactor inlet 10 and the reactor outlet 11 in which is inserted sampling capillary 12 which allows a movement of reactor 1 along a longitudinal direction 3 while sampling capillary 12 is kept stationary. Sampling capillary 12 is provided with an orifice 14 for taking a fluid sample from the reactor chamber 9. The fluid sample then travels inside sampling capillary 12, e.g. due to a pressure gradient inside the sampling capillary, to arrive at an end 15 of sampling capillary 12 which is connected to e.g. a gas chromatograph (not shown) for analysis of the fluid sample. Through opposite end 16 of sampling capillary 12 is introduced a pyrometer fiber 17, or alternatively a thermocouple, with its tip 18 located at orifice 14. Pyrometer fiber 17 is connected to an evaluation unit (not shown) for displaying a temperature value. Reactor 1 is equipped with a window 19 with a length equal to the length of the reactor chamber 9 which is transparent for a radiation beam 20 generated e.g. by a laser 21. Radiation beam 20 emitted by laser 21 passes a beam splitter 22 and is then focused by a lens system 23 to be directed onto a sample 24, e.g. a catalyst bed, inserted into reactor chamber 9. During interaction of beam 20 with sample 24 part of the radiation is scattered and then is collected by lens system 23 to then pass beam splitter 22 in a linear direction. The scattered radiation then passes a notch filter 25 to remove light of a wavelength emitted by laser 21. Only radiation generated by Raman-scattering then is focused onto a detector 26 by a lens system 27 and a pinhole blend 28. The radiation generated by Raman-scattering is then analyzed by an evaluation unit 29 and displayed by a display unit 30.

For obtaining a profile of sample 24 in a longitudinal direction 3, table 2 is moved by action of motor 7 and spindle 6 to shift reactor 1 along a longitudinal direction 3. Since sampling capillary 12, tip 18 of pyrometer fiber 17 and beam 20 are kept in a stationary position while shifting reactor 1 positioned on table 2 in a longitudinal direction 3, a longitudinal profile of sample 24 positioned in reactor chamber 9 can be obtained for composition of the fluid phase, temperature of sample 24 and spectroscopic properties of sample 24 at the same time.

Figure 2:
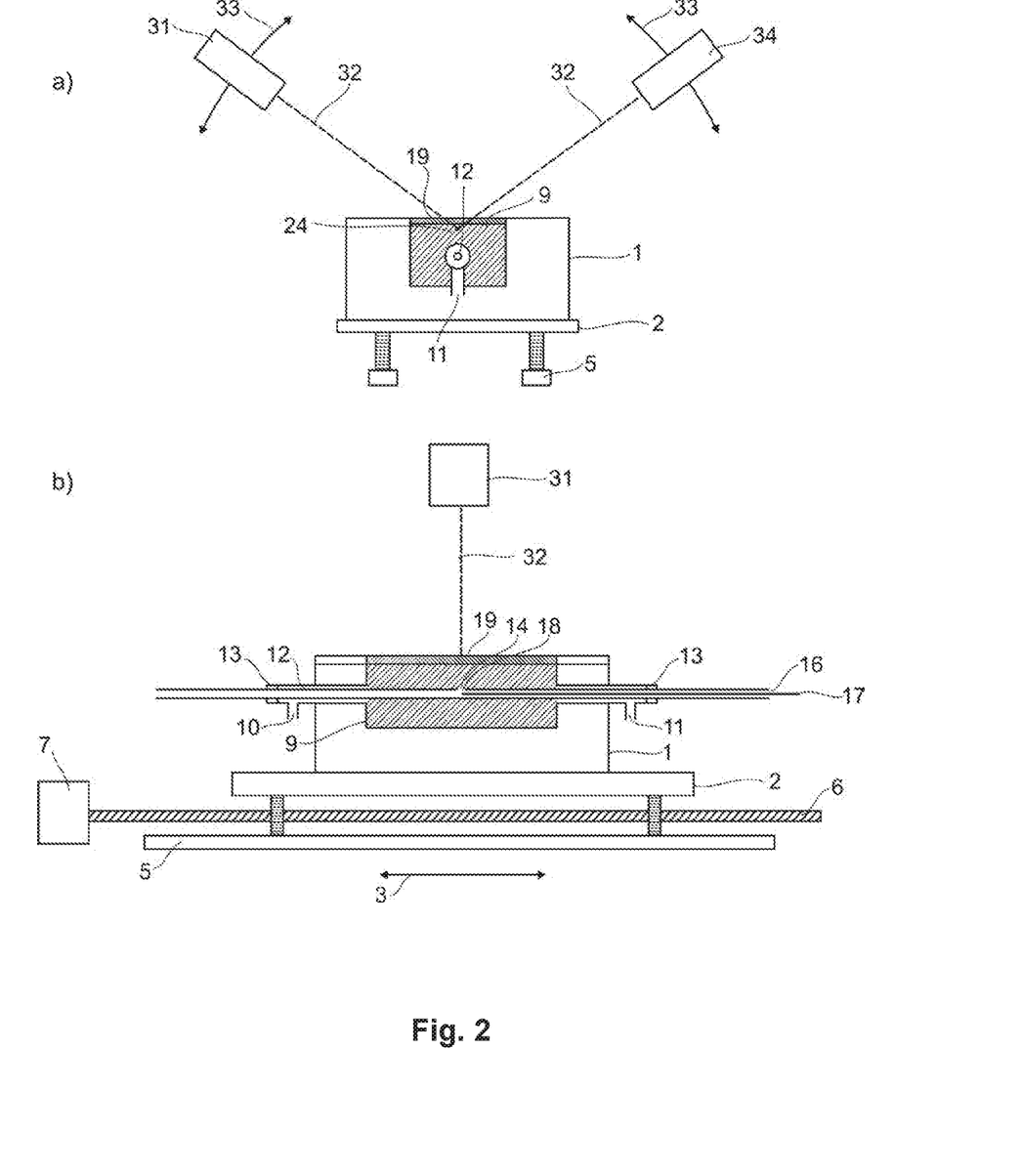
FIG. 2: a system according to a second embodiment comprising a reactor wherein analysis of a sample is made by X-ray diffraction.

In FIG. 2 is displayed a system according to the invention adapted for use of X-ray diffraction for analyzing a sample. FIG. 2a is a view along a longitudinal direction, i.e. along a shifting direction of reactor 1 and FIG. 2b shows a view perpendicular to the longitudinal shifting direction of reactor 1. Same numerals designate same parts of the system according to the invention.

Reactor 1 basically has the same configuration as the reactor described in FIG. 1. Reactor 1 comprises a reactor chamber 9. Reactor 1 is mounted on table 2 which is slidably mounted on rails 5 to be movable along a longitudinal direction 3. A sampling capillary 12 is traversing reactor chamber to collect a fluid sample inside reactor chamber 9 for analysis. A window 19 is provided on one side of the reactor chamber 9 which is transmissive for X-rays. An X-ray source 31 is provided which emits an X-ray beam 32 and can be moved on a segment of a circle 33. The X-ray beam 32 interacts with sample 24 to be diffracted. The diffracted parts of X-ray beam are collected in an X-ray detector 34 that is movable on a segment of a circle 33. The reflexes collected by the X-ray detector may then be further processed by a corresponding evaluation unit (not displayed) and displayed by a suitable display unit (not displayed).

FIG. 2a shows the Bragg-Brentano geometry for arrangement of the sample surface, x-ray source and X-ray detector. The sample surface is arranged in the center of the focusing circle 33. X-ray source 31 and X-ray detector 34 are moved on the focusing circle 33.

Figure 3:
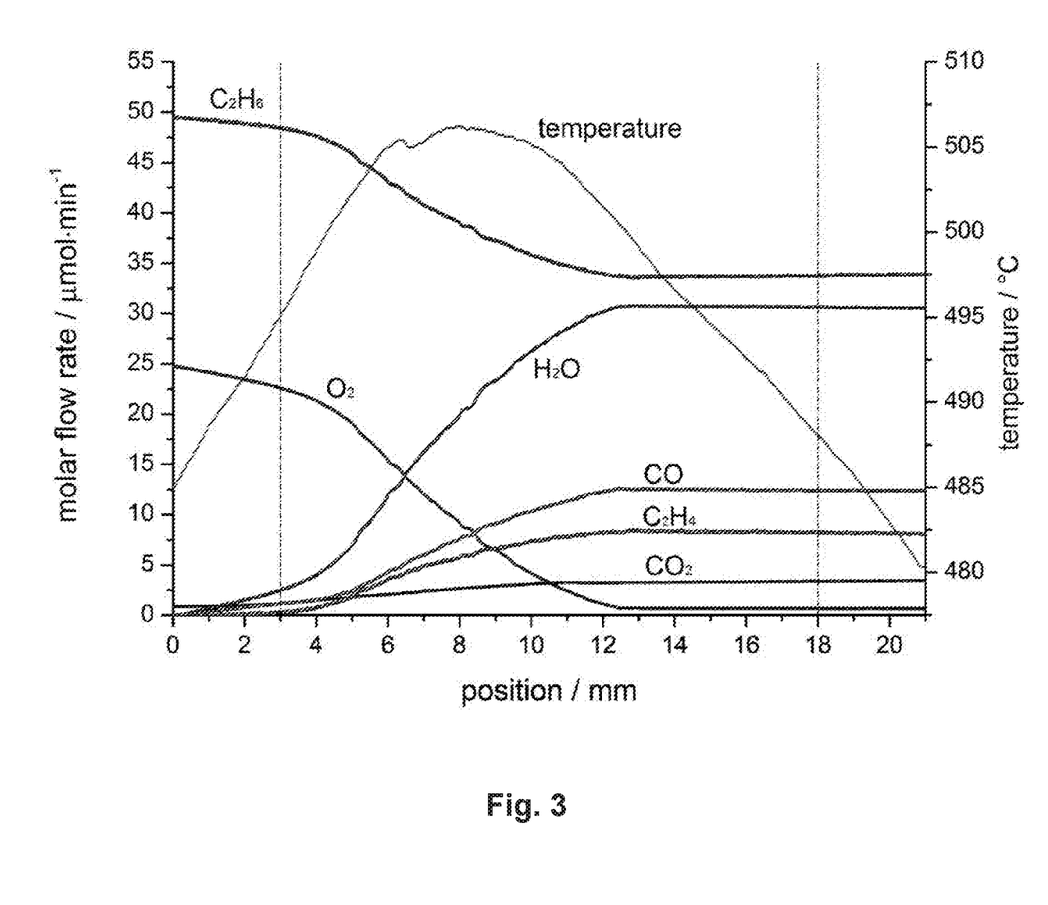
FIG. 3: a spatially resolved profile of the temperature and composition of the gas phase as determined in the reactor according to the invention.

FIG. 3 shows a profile of a concentration distribution and a temperature distribution as detected with a system as shown in FIG. 1. Ethane was oxidatively dehydrogenated to ethylene on a $VO_x/Al_2O_3$ catalyst at a temperature of 500° C.

At the reactor inlet (0 mm) concentration of reactants ethane and oxygen is high. When moving along the reaction coordinate in a longitudinal direction of the reactor the concentration of ethane and oxygen decreases while products water, carbon monoxide, ethylene and carbon dioxide are formed. Temperature within the reactor chamber increases to reach a hot spot at about 9 mm. Temperature then decreases again due to the low oxygen concentration.

LIST OF REFERENCE NUMBERS 1 reactor
2 table
3 longitudinal direction
4 supports
5 rail
6 spindel
7 motor
8 reactor case
9 reactor chamber
10 inlet
11 outlet
12 sampling capillary
13 seals
14 orifice
15 end of sampling capillary
16 end of sampling capillary
17 pyrometer fiber or thermocouple
18 tip of pyrometer fiber or of thermocouple
19 window
20 radiation beam
21 laser
22 beam splitter
23 lens system
24 sample
25 notch filter
26 detector
27 lens system
28 pinhole
29 evaluation unit
30 display unit
31 X-ray source
32 X-ray beam
33 Segment of a circle
34 X-ray detector

The invention claimed is:
1. A system for operando measurements comprising:
a reactor (1) comprising a reactor chamber (9) having at least one window (19) transparent (transmissive) for radiation for irradiating a sample (24) provided inside the reaction chamber (9);
a radiation source (21, 31) for generating the radiation for irradiating the sample (24), wherein the radiation source (21, 31) is arranged to irradiate the sample at an irradiation location situated on the sample;
a detection unit (26, 34) for detecting radiation scattered, emitted, reflected or diffracted by the sample (24) or transmitted through said sample (24);

a sampling capillary (12) comprising an orifice (14) for collecting a fluid sample inside the reactor chamber (9), wherein the orifice (14) of the sampling capillary (12) is arranged at a fixed position relative to the irradiation location;

wherein the reactor (1) is movable relative to the radiation source (21, 31), and wherein further the capillary is open at at least one distal end and the at least one open distal end is connected to a device for analyzing a fluid sample extracted from the reactor chamber.

2. The system according to claim 1, wherein the radiation source (21) is arranged stationary and the reactor (1) is arranged movably.

3. The system according to claim 1, wherein the reactor (1) is movable in a longitudinal direction (3) of the reactor chamber (9).

4. The system according to claim 1, wherein the sampling capillary (12) is traversing the reactor chamber (9) and the orifice (14) is arranged in a side wall of the sampling capillary (12).

5. The system according to claim 1, wherein the orifice (14) is arranged inside the reactor chamber (9) when the reactor (1) is in a position of maximum deflection.

6. The system according to claim 1, wherein the sampling capillary (12) is arranged stationary.

7. The system according to claim 1, wherein a temperature-sensitive sensor (17) is arranged in the reactor chamber (9), wherein the temperature-sensitive sensor has the form of a pyrometer fiber (17) or a thermocouple (17) comprising a tip (18) for sensing a temperature.

8. The system according to claim 7, wherein the pyrometer fiber or thermocouple (17) is arranged inside the sampling capillary (12) and the tip (18) of the pyrometer fiber or thermocouple (17) is arranged at the orifice (14) of the sampling capillary (12).

9. A method for analyzing a sample comprising the steps of
(1) Providing a system according to claim 1;
(2) Arranging a sample (24) inside the reactor chamber (9);
(3) Flowing a fluid through the reactor chamber (9) that reacts on or with the sample (24);
(4) Positioning reactor (1) in a first position;
(5) Taking a fluid sample from the fluid flown through the reactor chamber (9) at the first position by means of the sampling capillary (12) and analyzing said fluid sample;
(6) Irradiating the sample (24) arranged inside the reactor chamber (9) at the first position by directing radiation emitted from the radiation source (21, 31) to a irradiation location on the sample (24);
(7) Detecting radiation scattered, emitted, reflected or diffracted by the sample (24) arranged inside the reactor chamber (9) or transmitted through the sample (24) at the first position;
(8) Analyzing the sample state based on evaluation of the radiation scattered emitted, reflected or diffracted by the sample (24) or transmitted through the sample (24);
(9) Moving the reactor (1) into a position distant to the first position;
(10) Repeating steps (6) to (9) until a last position is reached.

10. A method according to claim 9, wherein a temperature of the fluid or of the sample is measured at a position of the orifice (14) of the sampling capillary (12) while taking a fluid sample or irradiating the sample.

* * * * *